Feb. 17, 1942.　　　　E. E. MOYER　　　　2,273,586
ELECTRIC VALVE CIRCUITS
Filed July 6, 1940　　　2 Sheets-Sheet 1
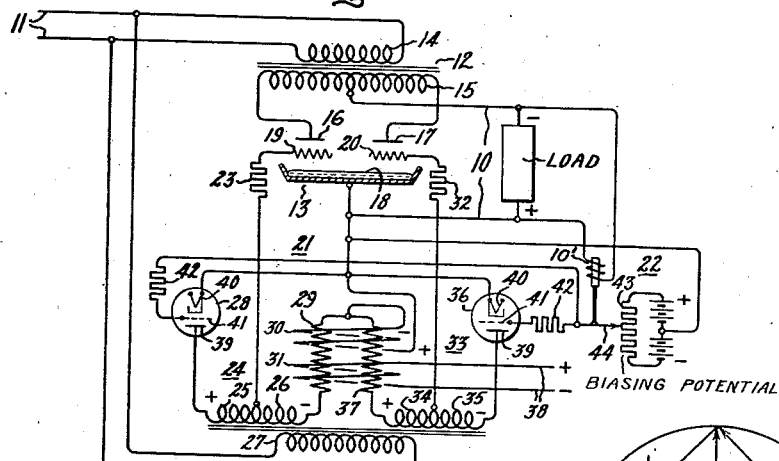
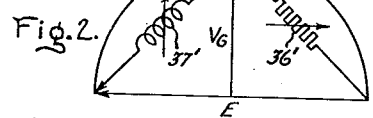
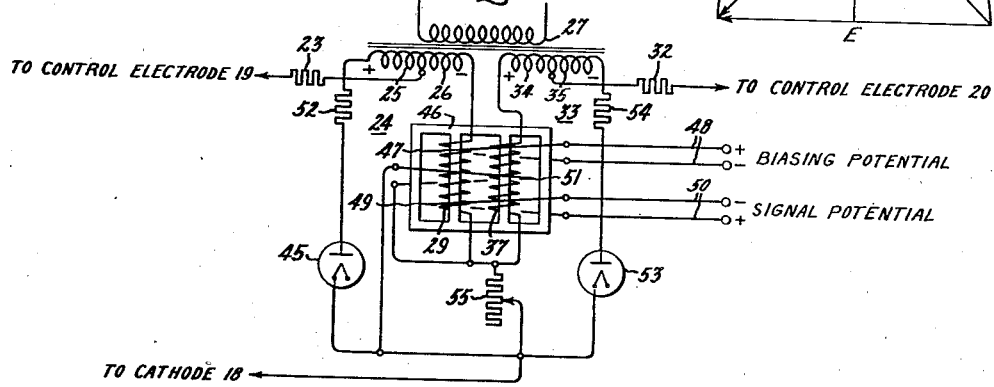
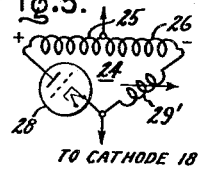
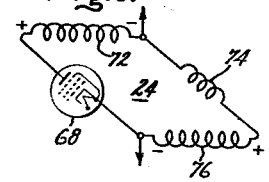
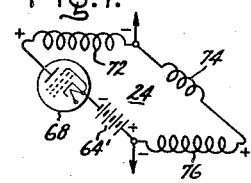
Inventor:
Elmo E. Moyer,
by Harry E. Dunham
His Attorney.

Feb. 17, 1942.   E. E. MOYER   2,273,586
ELECTRIC VALVE CIRCUITS
Filed July 6, 1940   2 Sheets-Sheet 2
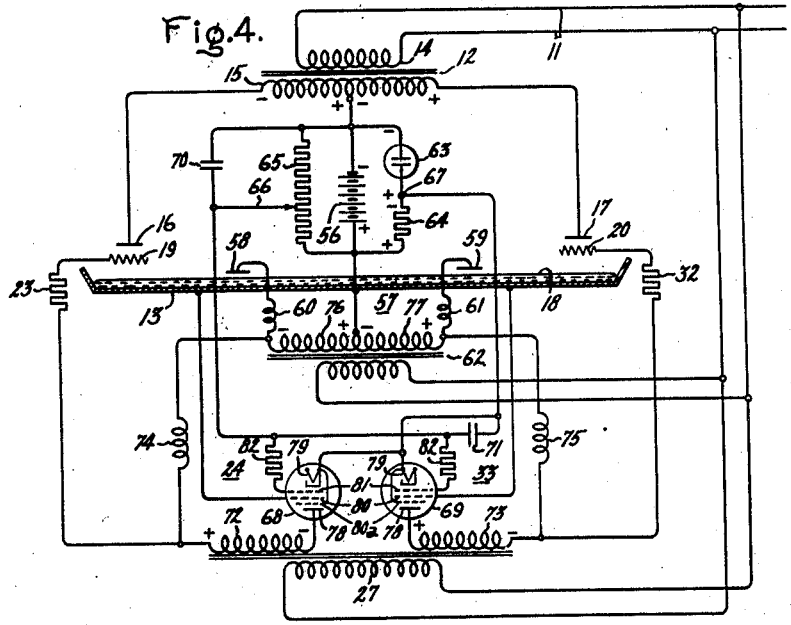
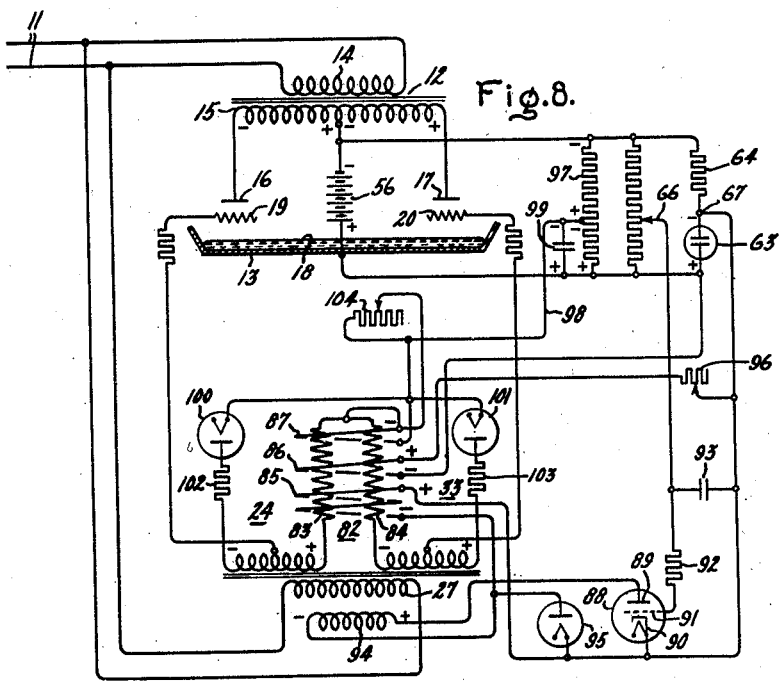
Inventor:
Elmo E. Moyer,
by Harry E. Dunham
His Attorney.

Patented Feb. 17, 1942

2,273,586

UNITED STATES PATENT OFFICE 2,273,586

ELECTRIC VALVE CIRCUITS

Elmo E. Moyer, Scotia, N. Y., assignor to General Electric Company, a corporation of New York Application July 6, 1940, Serial No. 344,280

13 Claims. (Cl. 175—363)

My invention relates to electric valve circuits and more particularly to control systems for electric valve translating apparatus.

In the application of electric valve systems it is frequently desirable to maintain an output voltage within a narrowly defined range of values. For example, in electric valve translating apparatus for battery charging systems, it is important to maintain the voltage impressed across the batteries at a substantially constant value. In accordance with the embodiments of my invention described hereinafter, I provide new and improved control systems which maintain the output voltage of electric valve translating apparatus at a substantially constant value. Further, in order to control accurately the output voltage of an electric valve translating apparatus which requires an appreciable amount of grid current for such control, it would be desirable to obtain a wide variation in the phase shift of the grid potentials in response to a very small controlling action. In other words, it would be desirable to control a low impedance grid circuit from a high impedance source. Accordingly I have devised a new and improved phase shifting circuit for accomplishing this result.

It is an object of my invention to provide new and improved electric valve circuits.

It is another of my invention to provide new and improved control systems for electric valve translating apparatus.

It is a further object of my invention to provide an improved static phase shifting circuit which is sensitive to a relatively small change in a controlling action or quantity.

In accordance with the illustrated embodiments of my invention described hereinafter, I provide new and improved electric valve translating circuits for transmitting power from an alternating current supply circuit to a direct current load circuit. The electric valve translating apparatus for accomplishing this result requires an appreciable amount of grid or excitation current for controlling the output voltage. I provide an improved control system whereby the direct current output voltage is maintained at a substantially constant value by virtue of a high impedance source of control potential. A pair of phase shifting bridges is provided, one arm containing a high vacuum electric discharge valve providing a variable resistance and the other arm containing a variable reactance. The high impedance source of control potentials is applied directly to the control electrodes of the vacuum type valve to vary the impedance or resistance thereof and a feed back arrangement is provided to affect the impedance of the other arm of the bridge to produce an implified phase shift of excitation voltage so that the output voltage is maintained without substantial variation from a constant value. Instead of both variable resistance and variable reactance in a control circuit, a constant resistance and variable reactance may be used or a constant reactance and variable resistance.

The novel features which I believe to be characteristic of my invention are set forth with particularity in the appended claims. My invention itself, however, will best be understood by reference to the following description taken in connection with the accompanying drawings in which Fig. 1 is a diagrammatical representation of an electric valve converting apparatus embodying my invention; Fig. 2 is a schematic diagram to aid in the understanding of Fig. 1; Fig. 3 represents a modification of a portion of the arrangement illustrated in Fig. 1; Fig. 4 represents still another modification of the apparatus as applied to a battery charger; Figs. 5, 6 and 7 are schematic diagrams to aid in the understanding of the operation of the apparatus illustrated in Fig. 4; and Fig. 8 represents still another modification of my invention.

Referring more particularly to the embodiment of my invention shown in Fig. 1, I provide an electric valve translating circuit for energizing a direct current load circuit 10 from an alternating current supply circuit 11 through a transformer 12 and electric valve means 13. The transformer 12 may comprise a primary winding 14 connected to alternating current supply circuit 11 and a secondary winding 15 the midpoint of which is connected to the negative terminal of load circuit 10. The end terminals of secondary winding 15 are connected to anodes 16 and 17 of electric valve device 13 which is illustrated as provided with a pool type of cathode 18. Electric valve device 13 is also provided with a pair of control electrodes 19 and 20 in order to control the output voltage of load circuit 10. Electric valve device 13 is preferably of the type employing an ionizable medium, such as a gas or a vapor, and although I have illustrated electric valve device 13 as of the multi-anode, single-cathode type, it will be understood by those skilled in the art that single-anode, single-cathode valves might equally well be used. In order to control the output voltage at load circuit 10, an excitation circuit 21 is provided for control electrodes 19 and 20. Excitation circuit 21 comprises an arrangement for supplying an appreciable amount of grid current to control electrodes 19 and 20 from a high impedance source of potential 22 which may be controlled in response to an electrical condition of load circuit 10, as for example the voltage thereof as will be explained in more detail at a later point in the description. Excitation circuit 21 comprises two separate circuits for producing control potentials displaced in phase from one another by 180 electrical degrees with reference to alternating current supply circuit 11 in order that electric valve device 13 may operate in the manner of the well-known biphase rectifier. Control electrode 19 is connected in a control circuit comprising current limiting resistor 23 and impedance phase shifting circuit 24. This impedance phase shifting circuit 24 comprises a pair of adjacent impedance arms 25 and 26 which may be in the form of reactors or inductors. In the instance shown, these inductors 25 and 26 comprise a voltage dividing means for the alternating potential which is impressed thereon by means of winding 27 thus forming a transformer. The winding 27 is preferably energized from the source of the alternating current circuit 11. One of the remaining arms of the impedance phase shifting device 24 comprises an electric discharge valve 28 of the high vacuum type which provides a variable resistance means while the other arm comprises a variable reactance winding 29 of the saturable type provided with two direct current windings 30 and 31 the purpose of which will be hereinafter described. Similarly, control electrode 20 is connected in an excitation circuit including current limiting resistor 32 and impedance phase shifting circuit 33. This impedance phase shifting circuit 33 is substantially identical with impedance phase shifting circuit 24 described above and comprises a pair of adjacent impedance arms 34 and 35 which act as voltage dividing means for the alternating current potential which is impressed thereon by means of winding 27. One of the remaining arms of the impedance phase shifting device 33 comprises electric discharge valve 36 of the high vacuum type which provides a variable resistance means while the remaining arm comprises variable reactor 37 of the saturable type, the reactance of which is arranged to be controlled by direct current windings 30 and 31 mentioned above. Direct current winding 31 is arranged to be energized from a suitable source of direct current 38 thereby saturating the core upon which reactance windings 29 and 37, respectively, are wound. Direct current saturating winding 30 provides a regenerative arrangement for increasing the sensitivity of the phase shifting circuit and is connected in series with reactance windings 29 and 37 respectively. Winding 30 is arranged to be energized by pulses of direct current flowing through the electric discharge valves 28 and 36 respectively. Electric discharge valves 28 and 36 comprise anodes 39, cathodes 40 and control electrodes or grids 41. The cathodes 40 of electric discharge valves 28 and 36 respectively are connected together and also connected to the cathode 18 of electric valve device 13. Control electrodes 41 of electric discharge valves 28 and 36 are arranged to be energized from the high impedance source of potential 22 through current limiting resistors 42. High impedance source 22 is illustrated as a voltage divider 43 having a movable control arm 44 connected in the grid-to-cathode circuit of electric discharge valves 28 and 36 respectively. It will be understood by those skilled in the art that movable arm 44 may be controlled automatically in response to an electrical condition of supply circuit 11 or of load circuit 10 and may, for example, be controlled by relay 10' in accordance with the voltage of load circuit 10.

The operation of the electric valve converting apparatus illustrated in Fig. 1 is substantially as follows: The alternating potential of load circuit 11 is impressed across transformer 12 and discharge paths including anodes 16 and 17 alternately become conductive to transmit energy to direct current load circuit 10. Control potentials 180 electrical degrees out of phase are impressed on control electrodes 19 and 20 by virtue of phase shifting circuits 24 and 33 respectively which are arranged to be energized from alternating current circuit 11 through a transformer comprising primary winding 27 and a pair of secondary windings 25, 26 and 34, 35 respectively. If the potential of load circuit 10 decreases below the predetermined constant value which it is desired to maintain, it is necessary to advance the phase of the control potentials impressed upon control electrodes 19 and 20 thereby to increase the output voltage. This may be accomplished by moving arm 44 of voltage divider 43 manually or automatically by relay 10' in such a direction as to impress increased negative potentials upon control electrodes 41 of electric discharge valves 28 and 36 respectively. As the grid potentials are made more negative with respect to the cathodes, electric discharge valves 28 and 36 provide an increased resistance in phase shifting circuits 24 and 33 respectively and correspondingly less current is allowed to flow through direct current winding 30 associated with reactance means 29 and 37 respectively. Since winding 30 is wound in such a direction as to oppose the saturation effect of biasing winding 31 which tends to saturate the core upon which reactance windings 29 and 37 respectively are wound, an increase in the impedance provided by electric discharge valves 28 and 36 will cause a corresponding decrease in the impedance of reactance members 29 and 37. This results because a decrease in the current flowing in the winding 30 due to an increase in impedance of valves 28 and 36 provides less opposition to the saturation of the core by winding 31. As the core becomes more saturated the impedance of windings 26 and 37 decreases. Hence by increasing the variable resistance arm of impedance phase shifting circuits 24 and 33 respectively and also at the same time decreasing the reactance of windings 29 and 37, the phase of the control potentials impressed on control electrodes 19 and 20 will be advanced thereby increasing the output voltage and restoring normal conditions. By varying the magnitude of the resistance and impedance in the parallel electric paths of the phase shifting circuit in opposite directions in response to variations in the condition controlled an amplified shift in phase of the control potential is obtained.

The operation of impedance phase shifting circuits 24 and 33 may best be understood by reference to Fig. 2 where the voltage vector E represents the potential impressed across the secondary winding sections 34 and 35 which is also in phase with the potential impressed upon the anode 17 of electric valve device 13. $V_G$ represents the voltage vector of the potential impressed on control electrode 20 for a particular operating condition the phase of which may be shifted 90 degrees in either direction from the position shown in Fig. 2. Variable reactance winding 37' is schematically shown in Fig. 2 as well as variable resistance member 36' which is representative of the electric discharge valve 36. It will be well understood by those skilled in the art that if variable resistance 36' is increased and at the same time variable reactance 37' is decreased, the grid potential $V_G$ will be rotated in a counterclockwise direction so as to be more nearly in phase with respect to the anode potential represented by E, thereby advancing the phase of the grid excitation and increasing the output voltage of load circuit 10. It is to be understood that the polarity markings showing the connections with inductive windings 25, 26, 34 and 35 represent instantaneous polarities for purposes of explanation.

It will be understood by those skilled in the art that instead of varying both the resistance and reactance elements of the impedance phase shifting devices 24 and 33, it is possible to vary only one of these elements while the other remains constant. Accordingly in Fig. 3, I have illustrated the excitation circuit 21 of Fig. 1 wherein a constant resistance element is provided in one arm of the impedance phase shifting grid circuit and a variable reactance element is provided in the other arm. The corresponding elements of the apparatus illustrated in Fig. 3 will be designated by the same reference numerals as those of Fig. 1. Impedance phase shifting bridge 24 is provided with a constant resistance element 45 illustrated as an electric discharge valve while the other arm of the impedance phase shifting device is provided with variable reactance means 29, as illustrated in Fig. 1, wound upon a suitable core 46. Three direct current saturating windings are provided for the core 46 upon which reactance windings 29 and 37 are wound. Direct current saturating winding 47 is energized from a suitable source of direct current potential 48 and acts as a bias winding for saturating the core 46. Direct current winding 49 is the control winding and may be energized from any suitable source of control potential 50 as for example from a voltage divider regulating means 43 as illustrated in Fig. 1. Direct current winding 51 is a regenerative arrangement for amplifying the effect of control winding 49 and produces a flux in core 46 in the same direction as winding 49. The flux produced by winding 47 on the other hand opposes the flux produced by windings 49 and 51. Suitable anode resistors 52 are provided in series with electric discharge valve 45.

Similarly, impedance phase shifting means 33 also comprises a constant resistance element illustrated as electric discharge valve 53 of the high vacuum type and resistance means 54 in series therewith. A variable resistance 55 is provided in order to control the amount of current flowing through regenerative winding 51. The operation of the apparatus illustrated in Fig. 3 will be readily understood by those skilled in the art from the description relating to Fig. 1. Any variation of the control or signal potential 50 impressed on winding 49 will vary the saturation of core 46 upon which variable reactance windings 29 and 37 are wound, thus varying the current which flows through direct current winding 51 and hence producing an amplifying effect so that a small change in the control potential 50 will give a greater change in the reactance of windings 29 and 37 and hence a greater or amplified shift in the phase of the control potentials impressed on control electrodes 19 and 20 of electric valve device 13.

Instead of varying the reactance element and allowing the resistance element to remain constant, it will be understood by those skilled in the art that one may vary the resistance element and allow the reactance element to remain constant. Accordingly in Fig. 4, I have illustrated this modification of my invention as applied to a battery charger. The corresponding parts of Fig. 4 are characterized by the same reference numerals as in Fig. 1. The battery 56 is connected between the anode and cathode of the biphase rectifier. A holding anode circuit 57 is illustrated as comprising a pair of holding anodes 58 and 59 connected in series with reactors 60 and 61 respectively. The holding anodes are energized from the source of alternating potential 11 through a suitable transformer 62. In order to obtain a control potential responsive to variations in voltage across battery 56, I have provided a circuit connected across battery 56 which includes an electric valve 63 of the glow discharge type opertaing as a constant voltage element connected in series with a resistor 64. Voltage divider 65 is also connected in parallel with battery 56 and by means of movable arm 66 it is possible to control the range of the control potentials so that batteries of different voltage may be charged with the same apparatus. Since the potential across glow discharge tube 63 is constant, any variations in battery voltage will appear across resistor 64 and hence a control potential responsive to deviations from normal of the battery voltage may be obtained across movable arm 66 and terminal 67 which are connected across the grid-to-cathode circuit of electric discharge valves 68 and 69 acting as variable resistors in impedance phase shifting circuits 24 and 33 respectively. A stabilizing capacitor 70 may be connected across a portion of resistor 65 if desired and a filter capacitor 71 may be connected across the grid-to-cathode circuit of electric discharge valves 68 and 69. Impedance phase shifting circuits 24 and 33 respectively include inductive windings 72 and 73 and fixed reactors 74 and 75 as well as windings 76 and 77 forming the secondary winding of transformer 62. Electric discharge valves 68 and 69 are preferably of the high vacuum type and are provided with anodes 78, cathodes 79, screen grids 80 which are illustrated as connected to the cathode 18 of electric valve device 13, and control electrodes 81 connected through suitable current limiting resistors 82 to the source of control potential obtained across terminal 67 and movable arm 66. The valves 68 and 69 may also be provided with suppressor grids 80a located between the screen grids 80 and the plates 78. The suppressor grids are connected to the cathodes 79 as illustrated.

The operation of the electric valve converting apparatus illustrated in Fig. 4 will be understood in view of the detailed description set forth in connection with Fig. 1. The electric valve device is put into operation through a suitable starting means not shown. The alternating potential from supply circuit 11 is converted to direct current for charging battery 56. If for any reason the voltage of the battery 56 should go above the predetermined value, a control potential will be obtained across movable arm 66 and terminal 67 which will impress a positive potential on control grids 81 thereby decreasing the resistance thereof and since no change in reactance will occur in reactors 74 and 75, reference to Fig. 2 will show that the control potentials impressed on control electrodes 19 and 20 of electric discharge device 13 will be retarded in phase relative to the anode voltage impressed across anodes 16 and 17 and hence the output voltage will be decreased thereby restoring normal conditions.

Figs. 5, 6, and 7 are provided to illustrate the similarity between the phase shifting impedance devices of Figs. 1 and 4. In Fig. 5 the impedance phase shifting circuit 24 of Fig. 1 is schematically represented. In Fig. 6 the phase shifting arrangement of Fig. 5 is modified so that the voltage windings 25 and 26 of Fig. 5 have been separated and placed in a different arm of the bridge circuit 24. These are represented by reference numerals 72 and 76 respectively to correspond with the corresponding elements of Fig. 4. This amounts to an interchange of elements 74 and 76 and since the impedances of these elements are fixed, the operation of the impedance phase shifting bridge will not be changed by interchanging these elements. Fig. 7 is a modification of Fig. 6 incorporating a potential element 64' corresponding to the voltage drop across resistor 64 of Fig. 4. It is observed therefore that the phase shifting circuit 24 of Fig. 4 which is schematically illustrated in Fig. 7 functions in substantially the same manner as the phase shifting circuit of Fig. 1 schematically represented by Fig. 5.

In Fig. 8 I have illustrated a modification of the electric valve battery charger illustrated in Fig. 4 wherein a variable reactance element and a constant resistance element are provided in the impedance phase shifting circuits 24 and 33 respectively. A saturable reactor 82 is provided having one reactance winding 83 connected in impedance phase shifting circuit 24 while the other reactance winding 84 is connected in one leg of impedance phase shifting circuit 33. Three saturating windings 85, 86 and 87 respectively are provided for saturable reactor 82. Saturating winding 85 is energized with a direct current control potential obtained across movable arm 66 and terminal 67 of a circuit substantially identical with that described in connection with Fig. 4. This control potential is impressed across the grid-to-cathode circuit of electric discharge valve 88 preferably of the high vacuum type provided with an anode 89, a cathode 90 and a control electrode 91. A current limiting resistor 92 is provided in series with control electrode 91 and a filter capacitor 93 may be connected across the grid-to-cathode circuit of electric discharge valve 88 if desired. Electric discharge valve 88 operates as a rectifier being energized with alternating potential through secondary winding 94 inductively coupled with primary winding 27 energized from alternating current supply circuit 11. In order to protect the apparatus from the high inverse voltage peaks and to absorb the induced voltage of winding 85 during the negative half cycle of winding 94, I provide electric valve 95. A direct current therefore flows in control winding 85 which is directly responsive to variations in potential of battery 56. A constant bias potential is impressed across saturating winding 86 which may be varied by virtue of resistor 96 so as to shift the control point of the apparatus to the most sensitive position. This potential is obtained across constant voltage device 63. In order to provide a negative bias for control electrodes 19 and 20 of electric discharge device 13, I provide resistor 97 connected across battery 56 from which a suitable negative bias may be obtained by virtue of conductor 98 and impressed across the grid-to-cathode circuit of electric discharge valve 13. A suitable filter capacitor 99 may also be provided. In order to increase the amplification factor of impedance phase shifting circuits 24 and 33 when a change in the control potential across saturating winding 85 occurs, I provide a regenerative arrangement for energizing saturating winding 87 with direct current in such a direction as to aid the effect of winding 85. The constant resistance elements of phase shifting impedance circuits 24 and 33 respectively comprise electric discharge valves 100 and 101 connected in series with resistors 102 and 103 respectively. A variable resistor 104 is provided in order to control the amplification effect of the regenerative arrangement. If the potential of the battery 56 increases above the desired value, a potential will be obtained across movable arm 66 and terminal 67 such as to impress a negative potential on control electrode 91 of electric valve 88 with respect to cathode 90, thereby decreasing the conductivity and hence decreasing the saturating current flowing through winding 85. A decrease in this saturating current will allow an increase in the reactance of windings 83 and 84 connected in the respective impedance phase shifting circuits 24 and 33, which, as seen by reference to Fig. 2, will cause the phase of the grid potentials impressed on control electrodes 19 and 20 to be retarded with respect to the anode potentials and hence decrease the output voltage thus restoring normal conditions. It will be understood that the regenerative winding having less direct current flowing therethrough will cause a further decrease in saturation and hence the further increase in reactance and thus amplify the effect of control potentials impressed across saturating winding 85.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In combination, a supply circuit, electric translating apparatus, electric valve means including a control member interconnecting said supply circuit and said translating apparatus, an excitation circuit for energizing said control member to vary the conductivity of said electric valve means in accordance with an operating condition of said translating apparatus, said excitation circuit including parallel electric paths each including in series a source of periodic voltage and a variable impedance element, the impedance element in one of said paths comprising an electric valve and the other of said impedance elements comprising an impedance variable in response to the current conducted by said electric valve, and means for controlling the conductivity of said electric valve in response to variations in said operating condition of said translating apparatus.

2. In combination, a supply circuit, a load circuit, electric translating apparatus interconnecting said circuits for transmitting energy therebetween and comprising electric valve means having a control member, an excitation circuit for energizing said control member to vary the conductivity of said electric valve means, said excitation circuit including parallel electric paths each including in series a source of periodic potential and a variable impedance element, the impedance element in one of said paths comprising an electric valve and the other of said impedance elements comprising a saturable reactor saturable in response to the current conducted by said electric valve, and means for controlling the conductivity of said electric valve in response to an electrical condition of one of said two first named circuits.

3. In combination, an alternating current circuit, a direct current circuit, electric translating apparatus interconnecting said circuits and comprising electric valve means having a control member for controlling the conductivity thereof, an excitation circuit for energizing said control member to vary the conductivity of said electric valve means in response to an electrical condition of one of the circuits interconnected thereby, said excitation circuit including parallel electric paths each including in series a source of periodic potential and a variable impedance element, the impedance element in one of said paths comprising an electric valve having a control member and the other of said impedance elements comprising a saturable reactor having a saturating winding energized in response to the current conducted by said electric valve, and means for controlling the conductivity of said electric valve in response to said electrical condition.

4. In combination, a supply circuit, a load circuit, electric translating apparatus interconnecting said circuits for transmitting energy therebetween and including an electric discharge valve including a control electrode, an excitation circuit for controlling the energization of said control electrode including an inductive winding providing a source of periodic potential, a control electric valve of the high vacuum type and a saturable reactor connected in series across the end terminals of said inductive winding, an output terminal intermediate the end terminals of said inductive winding, a second output terminal intermediate said valve and said reactor, said output terminals being connected in circuit with the control member of said electric discharge valve, means for controlling the conductivity of said control electric valve to vary the impedance thereof, the saturation of said reactor being controlled in response to the current transmitted by said control electric valve to vary the impedance thereof to amplify the phase shift between the potential appearing across said inductive winding and the potential across said output terminals resulting from a variation in the impedance of said control electric valve.

5. In combination, a source of periodic potential including voltage dividing impedance means having an intermediate terminal providing an output terminal, series connected impedance elements connected across said voltage dividing impedance means, a second output terminal intermediate the impedance elements connected across said voltage dividing impedance means, means for varying the impedance of one of said elements, and means responsive to a change in impedance of said one element for causing a substantially simultaneous change in the impedance of the other of said elements in the reverse direction to produce an amplified shift in phase between the potential appearing across said voltage dividing impedance means and the potential across said output terminals resulting from an initial change in the impedance of said one element.

6. In combination, an inductive winding providing a source of periodic potential, an electric valve of the high vacuum type and a saturable reactor connected in series across the end terminals of said inductive winding, an output terminal intermediate the end terminals of said inductive winding and a second output terminal intermediate said valve and said reactor, means for controlling the conductivity of said electric valve to vary the impedance thereof, a control winding associated with said saturable reactor and energized in response to the current conducted by said valve for controlling the impedance thereof to amplify the shift in phase between the potential appearing across said inductive winding and the potential across said output terminals resulting from a change in the impedance of said valve.

7. In combination, an alternating current circuit, a direct current circuit, electric translating apparatus interconnecting said circuits comprising electric valve means including a control member for controlling the conductivity thereof, an excitation circuit for energizing said control member and including a static phase shifting circuit, said phase shifting circuit including parallel electric paths, one of said paths including an electric valve of the variable impedance type having a control member and the other of said parallel paths including a saturable reactor means for energizing the control member of said electric valve in response to an electrical condition of one of the circuits interconnected by said electric translating apparatus, and a control winding associated with said saturable reactor and energized in response to the current transmitted by said electric valve to decrease the impedance of said saturable reactor as the impedance of said electric valve increases to produce an amplified shift in phase of the potential supplied to the control member of said electric valve means in response to a variation in said electrical condition.

8. In combination, a supply circuit, a load circuit, electric translating apparatus interconnecting said circuits comprising electric valve means including a control electrode, an excitation circuit for energizing said control electrode to control the output of said electric valve means, said excitation circuit including a static phase shifting circuit for impressing on said control electrode a periodic potential having a phase relation with respect to the anode-cathode potential of said electric valve means which is variable in response to an electrical condition of one of the circuits interconnected by said electric translating apparatus, said phase shifting circuit including parallel branches each of which comprises a source of periodic potential and an impedance element in series, one of said impedance elements comprising an electric valve having a control member and the other of said impedance elements comprising a saturable reactor, means for energizing the control member of said electric valve in response to said electrical condition, the saturation of said reactor being responsive to the current conducted by said electric valve to vary the impedance thereof in a direction to amplify the shift in phase of the periodic potential supplied to the control member of said electric valve means in response to variations in said electrical condition.

9. In combination, an alternating current circuit, a direct current circuit, electric translating apparatus interconnecting said circuits for transmitting energy therebetween and comprising a plurality of electric discharge valves each having a control electrode, an excitation circuit including a phase shifting circuit for energizing each of said control electrodes and each comprising a pair of parallel electric paths, each of said paths including a source of periodic potential and an impedance element, one of said elements comprising a control electric valve and the other of said elements comprising an inductive impedance, each of said phase shifting circuits including output terminals connecting the parallel electric paths of each of said phase shifting circuits in series circuit relation with the cathode and control electrode of each of said electric discharge valves, and means for controlling the impedance of one of said impedance elements in response to an electrical condition of one of said first two named circuits to control the phase of the potential appearing between said output terminals with respect to the phase of said periodic potential.

10. In combination, a supply circuit, a load circuit, electric translating apparatus interconnecting said circuits for transmitting energy therebetween and including electric valve means having a control electrode and a holding anode, a circuit for controlling the energization of said control member and said holding anode including a phase shifting network having parallel electric paths, each of said paths including a source of periodic potential and an impedance element, said impedance elements and said sources of periodic potential being connected in alternate relation, means connecting the common terminal of one of said impedance elements and one of said sources of potential with said control member, means connecting the common terminal of said impedance element and the other of said sources of periodic potential to said holding anode, and means for controlling one of said impedance elements in response to an electrical condition of one of said circuits to control the energization of said control member.

11. In combination, a supply circuit, a load circuit, electric translating apparatus interconnecting said circuits comprising electric valve means including a control member, means for controlling the energization of said control member in response to an electrical condition of one of the circuits interconnected by said translating apparatus including parallel electric paths each including a source of periodic potential and an impedance element, one of said impedance elements comprising a saturable reactor having a control winding energized in response to said electrical condition to vary the saturation of said reactor, and a second winding energized in response to the magnitude of current flowing in said saturable reactor to amplify the phase shift of said periodic potential resulting from the variation in said electrical condition.

12. In combination, a supply circuit, electric translating apparatus connected for energization from said circuit and including electric valve means having a control member, a control circuit for controlling the energization of said control member including a variable impedance element, means responsive to an operating condition of said translating apparatus for varying the impedance of said element, and means responsive to a change in impedance of said element for further altering said impedance in the same direction to amplify the impedance change in said element occurring in response to a variation in said operating condition, said impedance element being connected in the energizing circuit of said control member to vary the excitation thereof in response to variations in said electrical condition.

13. In combination, a supply circuit, a load circuit, electric translating apparatus interconnecting said circuits for transmitting energy therebetween including a plurality of electric discharge valves each including a control member, a static phase shifting network for controlling the excitation of said control members including parallel electric paths each including a source of periodic potential and an impedance element, one of said impedance elements comprising a saturable reactor including a biasing winding for normally saturating the core of said reactor, a control winding tending to overcome the effect of said biasing winding and energized in response to variations in an electrical condition in one of said circuits, and an additional winding energized in response to the current conducted by said saturable reactor for producing a magnetomotive force in the same direction as said control winding to produce an amplified change in impedance of said saturable reactor in response to variations in said electrical condition.

ELMO E. MOYER.